UNITED STATES PATENT OFFICE.

IRA S. BARNETT, OF LOUISVILLE, KENTUCKY.

PROCESS OF MANUFACTURING CANDY.

SPECIFICATION forming part of Reissued Letters Patent No. 11,107, dated August 26, 1890.

Original No. 419,001, dated January 7, 1890. Application for reissue filed July 28, 1890. Serial No. 360,222.

*To all whom it may concern:*

Be it known that I, IRA S. BARNETT, of Louisville, in the county of Jefferson, State of Kentucky, have invented an Improvement in the Process of Manufacturing Candy, of which the following description is a specification.

This invention relates to the manufacture of stick candy, cream bonbons, or analogous white candy, and has for its object to provide a novel and cheap method for making the same.

Prior to my invention I am aware that stick candy, cream bonbons, or analogous white candy have been made from refined crystallized cane sugar alone, and also of refined crystallized sugar mixed with a quantity of glucose.

It is well known to those conversant with the manufacture of sugar that levulose, forming part of invert sugar, is much sweeter than either cane sugar or glucose.

In the manufacture of stick candy, cream bonbons, or analogous white candy as formerly practiced refined crystallized sugar alone was used, it being treated with a diluted acid to invert a portion of the sugar to prevent or retard crystallization of the cane sugar in the candy, and at the same time make a sweeter product. The retardation of the crystallization of cane sugar in the candy has been effected also by the use of glucose, which is mixed with the cane sugar; but the product or candy thus made does not possess the sweet property of the candy made from refined crystallized cane sugar alone.

My invention has for its object to produce stick candy, cream bonbons, or analogous white candy from unrefined cane sugar containing in its natural state cane sugar and invert sugar, whereby crystallization in the candy is obviated and a candy is produced equal or superior to that produced from refined crystallized cane sugar, my improved method enabling a superior quality of stick candy, cream bonbons, or analogous white candy to be produced at the lowest possible cost.

In the manufacture of refined crystallized cane sugar the raw sugar of commerce is first dissolved and diluted to a density of about 28° to 30° Baumé and the acids in the solution neutralized with lime-water. This solution is then filtered and the filtrate decolorized by passing through bone-black in well-known manner. The decolorized sugar solution is then placed in a vacuum-pan and the larger portion of the cane sugar crystallized out, the invert sugar, together with a portion of the cane sugar which is not crystallized, passing off to form what is known in commerce as the "sirup."

In accordance with my invention I preferably employ in the manufacture of stick candy, cream bonbons or analogous white candy the decolorized sugar solution above mentioned, and I omit by my method the crystallizing step, and at the same time I utilize the invert sugar normally in the solution and also that portion of the cane sugar which in the process of crystallizing passes into the sirup and which is lost in the production of refined sugar.

In order that my invention may be readily comprehended, I shall specifically describe the process of making white or substantially colorless candy preferred by me. The raw sugar of commerce in sufficient or desired quantity is first dissolved in water and diluted until it attains the proper density, preferably from 28° to 30° Baumé, more or less. This solution is then preferably tested to ascertain the percentage of invert sugar, and if the said sugar solution is found to contain the proper or desired percentage of invert sugar for making the kind of candy desired—viz., from fifteen to twenty per cent., more or less—then the acids in the solution will be neutralized by the addition of lime-water; but if the required percentage or amount of invert sugar is not found upon test to be present in the sugar solution, then in this case all the acids will not be neutralized, but only such portion as is not required to produce the desired percentage or amount of invert sugar in the solution. The sugar solution is then filtered to free it from impurities, and the filtrate decolorized in usual or well-known manner, as by passing through bone-black.

This decolorized sugar solution is employed by me in the manufacture of stick candy, cream bonbons, or analogous white candy, it being boiled *in vacuo* until it has attained the desired or required consistency to produce the desired or required kind of candy—such, for instance, as rock-candy, what is known as "hard crack," for making stick candy, what is known to the trade as "cream," for the production of hand-made candy, and any other white or substantially colorless candy desired.

In the manufacture of sugar from cane the juice expressed from the cane is boiled in a suitable apparatus until it has attained the desired consistency for crystallizing. This juice is then transferred to what is technically termed a "cooler," in which the cane sugar is crystallized, forming the raw sugar of commerce above referred to, the molasses and impurities passing from the said cooler and constituting what is known as "plantation molasses," which contains a substantially large quantity of invert sugar.

I prefer to employ the solution made from raw sugar, as above described; but, if desired, I may employ the plantation molasses above mentioned or a mixture of the molasses and raw sugar.

If it is desired to produce a cheaper and somewhat inferior quality of candy, I may employ glucose with the raw-sugar solution or the plantation molasses, or a mixture of the two.

In practice the unrefined sugar may be clarified and decolorized in bulk, boiled to a convenient density, and then shipped in suitable casks to smaller manufacturers to be made into any white or substantially colorless candy desired or required.

I do not claim, broadly, the utilization of invert sugar in the manufacture of candy, as I am aware that molasses containing invert sugar has been boiled to produce molasses candy; but so far as I am aware I am the first to employ invert sugar normally existing in the raw sugar in the manufacture of stick candy, cream bonbons, or analogous white or substantially colorless candy, whereby a cheaper and better product is obtained than that produced from crystallized cane sugar.

I claim—

1. The herein-described method of manufacturing stick candy, cream bonbons, or analogous white candy, which consists in treating unrefined sugar containing normal cane sugar and invert sugar, or cane sugar and invert sugar in their natural state, to produce a substantially clear solution, and then boiling the said solution *in vacuo* to the required or desired consistency to produce a white or substantially colorless candy, whereby the invert sugar in the unrefined sugar is employed in the manufacture of the said candy, substantially as described.

2. The herein-described method of manufacturing stick candy, cream bonbons, or analogous white candy, which consists in treating unrefined sugar containing normal cane sugar and invert sugar, or cane sugar and invert sugar in their natural state, to produce a substantially clear solution, adding glucose to said solution, and lastly boiling the mixed solutions *in vacuo* to the required consistency to produce stick candy, cream bonbons, or analogous white candy, whereby the invert sugar in the unrefined sugar is employed in the manufacture of said candy, substantially as described.

3. The herein-described method of manufacturing stick candy, cream bonbons, or analogous white candy, which consists in clarifying and decolorizing unrefined sugar to produce a substantially clear sugar solution containing normal or natural cane sugar and invert sugar, and then boiling said solution *in vacuo* to produce stick candy, cream bonbons, or analogous white candy, whereby the invert sugar in the unrefined sugar is employed in the manufacture of said candy, substantially as described.

IRA S. BARNETT.

Witnesses:
F. W. PRASSE,
ALBERT N. KAUFMAN.